Aug. 26, 1969  E. T. HENNESSEY  3,463,479
WORKPIECE POSITIONING DEVICE FOR MACHINE TOOL VISES
Filed Dec. 9, 1966
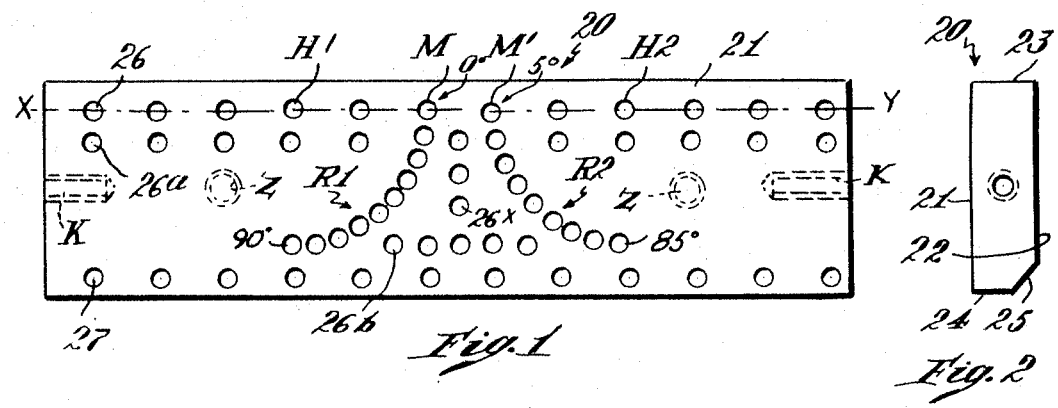
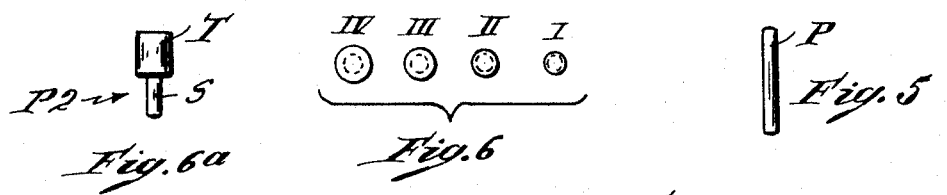
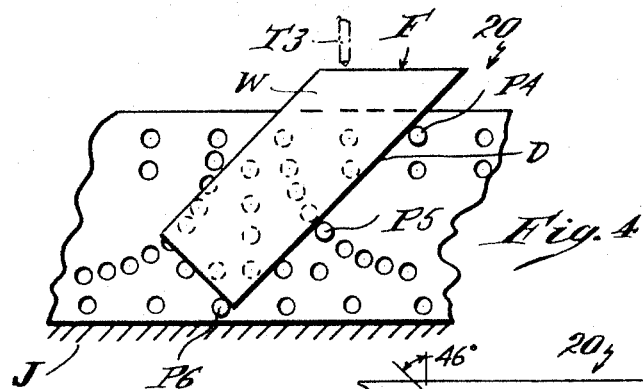
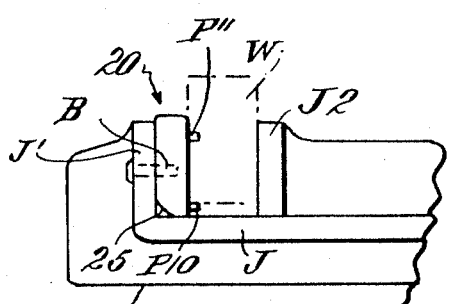
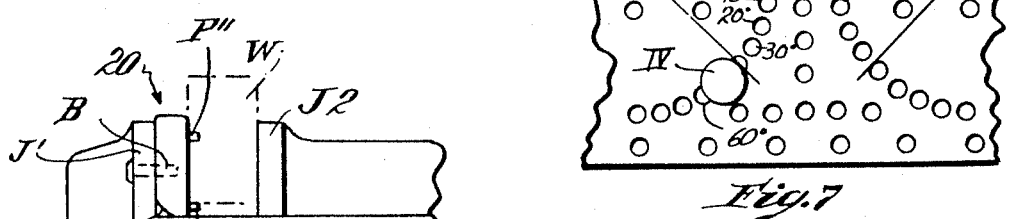
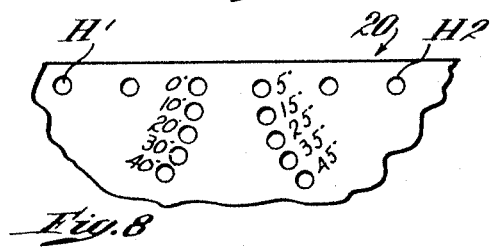

United States Patent Office 3,463,479
Patented Aug. 26, 1969

3,463,479
WORKPIECE POSITIONING DEVICE FOR MACHINE TOOL VISES
Everett T. Hennessey, Waltham, Mass., assignor to Zip Products, Inc., Waltham, Mass., a corporation of Massachusetts
Filed Dec. 9, 1966, Ser. No. 600,467
Int. Cl. B25b 1/24, 5/16
U.S. Cl. 269—271                          11 Claims

ABSTRACT OF THE DISCLOSURE

The invention provides a device of simple and inexpensive construction operative to facilitate the positioning of a workpiece in accurate relation to a machine tool while the workpiece is firmly held between the jaws of a machine tool vise.

The present invention constitutes an improvement over that disclosed and claimed in the application of Everett T. Hennessey, Ser. No. 408,518, filed Nov. 3, 1964, for Workpiece Positioning Device for Machine Tools.

Background of invention

The device of the aforesaid application comprises a rigid, substantially rectangular block of steel designed to be interposed between the jaws of a vise and to support a workpiece while the latter is being machined, the block having parallel front and rear vertical faces and several parallel rows of holes which extend completely through the block and which are designed to receive removable work-supporting pins which are of a length exceeding the thickness of the block but less than the combined thickness of the block and workpiece. By inserting three or more pins in selected holes in the block, they collectively constitute a supporting cradle for the workpiece.

It is thus possible for the workman to set up a workpiece with great accuracy in a selected position without recourse to the making of measurements. The device of the aforesaid application is thus very simple and very effective, in particular in enabling a workman, after having one set up the device for supporting the workpiece (which may be done without recourse to the making of measurements or the manipulation of complicated mechanism) to position successive, like workpieces, one after another, for machining without requiring any adjustment of parts. However, the device, as disclosed in said copending application, does not provide the user with any assistance in the selection of the desired holes for the reception of pins, leaving it for the workman, by trial and error, to determine just which holes should receive pins for setting the workpiece to the desired angle.

It has also heretofore been proposed to provide a device of the above general type wherein some of the pin-receiving holes are arranged in an arcuate row, usually of 90° extent, indexed to indicate angles. Then by placing a pin in the hole which constitutes the center of the arc, and in one of the holes of the arcuate series, corresponding to a selected indexed angle, and then arranging a third pin in another hole so as, with the others, to form a supporting cradle, that face of the workpiece which is to be presented to the tool may be disposed accurately at the angle selected—it being understood that the pins which are employed as just above described may all be of the same diameter and such as to fit with a close but sliding fit in any of the holes.

It has also been suggested previously that by the provision of "pegs," that is to say pins having heads larger in diameter than the normal pin, it becomes possible, by the substitution of a selected peg for a normal pin to set up the workpiece for angles intermediate those attainable by the uniformly spaced holes and pins of uniform diameter alone, the peg being so selected that when the workpiece is placed upon the pins, the desired face of the workpiece will be presented at the proper angle to the tool.

However, to provide for an extended series of progressively diminishing angles, a large number of pegs, having heads of progressively increasing diameter must be provided. This adds to the expense of the device and invites difficulty in selecting and handling of these independent small parts.

To avoid the necessity for using an extended series of pegs it would be desirable to space the centers of adjacent holes, in such a 90° arc, to correspond to angles of less than 10°, but for practical reasons, to do so it would be necessary to use a radius of curvature for the arcuate row so large that the base member, wherein the holes are formed, becomes larger and heavier than is convenient for handling, and useless for machining small parts where the environment of the workpiece, while undergoing treatment, is too confined for the reception of a work-positioning device of large dimensions.

Summary

Briefly stated, the present invention, in order to keep the work-positioning block within practical dimensions, while permitting the machining of holes for pins of practical size and spaced for the setting up of work to angles differing by 5° without recourse to the use of "pegs," provides the block with two arcuate rows of holes, the holes of each series being spaced a full 10° apart, but with those of one row indexed to even numbers, while those of the other series are indexed to odd numbers. In this manner it is possible, by the use of the normal pins, to set up the workpiece for angles varying by 5° from 0° to 90°, it being found that holes of a diameter of 0.126 inch may be arranged in such rows and that pins of a diameter of 0.125 inch to fit in such holes may be made sufficiently strong to perform the desired function. Then, by the use of but four pegs of different sizes, angles varying by 1° from 0° to 90° are readily obtainable. Using a block of acceptable dimensions, and an arc of one inch radius, holes of the above diameter may be drilled without unduly weakening the material of the block between adjacent holes.

In the accompanying drawings:

FIG. 1 is a front elevation of a workpiece positioning block according to the present invention;

FIG. 2 is an end elevation of the block of FIG. 1;

FIG. 3 is a fragmentary side elevation of a machine-tool vise showing a workpiece positioned between the vise jaws by the use of the block of the present invention;

FIG. 4 is a fragmentary elevation showing, in section, a portion of the base member of a machine-tool vise with a workpiece cradled in operative relation to a tool by the positioning device of the present invention;

FIG. 5 is an elevation of one of the normal work-supporting pins;

FIG. 6 is a composite plan view showing the heads of a series of special pins or "pegs" which may be employed in accordance with the present invention;

FIG. 6a is a side elevtaion of one of the special pins or pegs of the series shown in FIG. 6;

FIG. 7 is a fragmentary line diagram, to larger scale than FIG. 1, illustrative of the use of one of the special pins or pegs; and FIG. 8 is a fragmentary elevation showing a portion of the block and the manner in which the holes of the two arcuate rows are indexed.

Referring to FIGS. 1 and 2 the numeral 20 designates a workpiece-positioning block illustrative of a device according to the present invention, this block, as shown, being substantially rectangular and having parallel front and rear faces 21 and 22 respectively, and a substantially horizontal top face 23 and a bottom face 24, the lower rear edge of the block being beveled as shown as 25. For specific example of a block of convenient and practical dimensions, the block 20 shown may be 6 inches long; 1.500 inches high; 0.500 inch thick; and of carburized steel, ground to finish.

The block is provided with a plurality of holes Z indicated in dotted lines in FIG. 1 extending inwardly from the rear face of the block and which may be used for the reception of bolts B (FIG. 3) whereby the block may be fixedly secured to one of the jaws J¹ of a machine-tool vise, for example, of the customary type employed for holding workpieces in operative position in a machine tool. As here illustrated, the block 20 may also be provided with screw-threaded bores K extending inwardly from its opposite ends which are designed for the reception of bolts or the like (not shown).

As illustrated in FIG. 1 the block 20 is provided, by way of example, with three parallel rows of uniformly spaced holes 26, 26a and 27, desirably extending completely through the block (but not shown in FIG. 2) from its front face to its rear face, these holes being designed for the reception of removable work-positioning pins P (FIG. 5) or pegs P2 (FIGS. 6, 6a and 7). In addition to the rows of holes which extend, as shown, substantially the full length of the block and parallel to its upper edge, it is desirable, in order to increase the adaptability of the block, to provide the block with a shorter horizontal row of holes 26b spaced above the lower row and symmetrically disposed with relation to the opposite ends of the block, and also a short vertical row of holes 26x at the middle of the block.

In accordance with the present invention, the block is provided with two arcuate rows of holes as indicated at R¹ and R² respectively, the row R¹ having the axis of the hole H¹ of the upper row of hole 26 as its center of curvature and the row R² having the axis of the hole H² of the upper row as its center of curvature. The holes of each of these arcuate rows are desirably of the same diameter as the holes of the other rows. All of the holes in the block may, for instance, be of a diameter of 0.126 inch and the centers of the holes of the arcuate rows R¹ and R² being located on an arc of approximately one inch radius.

Using a rectilinear line, for illustration, X–Y (FIG. 1) passing through the centers of the holes H¹ and H², as a reference or base line for the measurement of the angles represented by the holes of the series R¹ and R², the uppermost hole M of the row R¹ represents zero degrees of arc, while successive holes of the series R¹ are spaced apart so that their centers represent angles, increasing by 10°, until the lowermost hole M of the series R¹ will represent an arc of 90°. On the other hand, in accordance with the present invention, the uppermost hole M¹ of the series R², as referred to the reference line X–Y, represents an angle of 5°. Successive holes of the series R¹ have their centers so spaced as to represent angles increasing by 10°, so that the lowermost hole of the series will represent an arc of 85°. It will be noted that the two arcuate rows are so arranged that their convexities are toward each other; a convenience in making and in the use of the block.

As illustrated in FIG. 8, which is a diagrammatic view, to larger scale than FIG. 1, the holes of each series are shown as indexed by numerals sunk into the material of the block, thus making it readily possible for the workman to set up the device to provide angles within a range of from 0° to 90°, by 5° differences without making any measurements or adjustments other than the placing of pins in selected holes of one of the other series in accordance with the indexed angle.

To provide an even finer adjustment, a series of special pins or "pegs" such as the peg IV of FIG. 6a is provided—a suitable series of pins or pegs being indicated in FIG. 6, as comprising the elements I, II, III and IV. Each of the pins of the series comprises a shank portion S (FIG. 6a), of the same diameter as a normal pin and a head portion T of a diameter exceeding that of the normal pin. The normal pin, for example, may be of a diameter of 0.125 inch. The head of the pin I may be of a diameter of 0.160 inch; while the heads of the series of pegs increase progressively by an increment of 0.035 inch so that of pin II 0.195 inch; the head of pin III 0.230 inch; and the head of pin IV is 0.265 inch. By selecting one of the pegs I–IV and substituting it for one of the normal or ordinary pins in one or the other of the arcuate series, an angle, intermediate that which is set up by the use of the normal pins, may be obtained. For instance, merely by way of example as shown in FIG. 7, the peg IV has been set in the hole indexed for 50° with the result that the angle thus defined is a 46° angle. Of course, it is obvious that the exact dimensions herein indicated are by way of example since a different series of indexed angles could be chosen.

While the arcuate rows R¹ and R² of pin-receiving holes provide ready means for setting up the workpiece so that the face of the workpiece which is to be presented to the tool makes a predetermined angle with reference to the base or reference line X–Y, it is obvious that the workpiece may be set up by placing pins in selected holes of the rectilinear rows of holes without reference to the arcuate rows, as described in the aforesaid copending application.

In most cases, it may be necessary to place pins in holes other than those of the arcuate rows in order to provide a cradle for supporting the workpiece even though pins of the arcuate rows are used for positioning the workpiece to the desired angle. Thus, as illustrated in FIG. 4, the edge D of the workpiece W is positioned by a pin P⁴ in that hole of the upper row of holes which defines the center of curvature of the arcuate row R² and also the pin P⁵ of the arcuate row R² which designates the 45° angle as well as a pin P⁶ of the lowermost horizontal row. With this arrangement the upper surface F of the workpiece W lies in a horizontal plane since this face of the workpiece makes an angle of 45° with the edge D.

As illustrated in FIG. 3, the workpiece W is interposed between the vise jaw J² and the block 20, with the beveled edge 25 of the block arranged at the intersection between the vertical face of the jaw J¹ of the vise and the horizontal surface of the base member J of the vise, while the lower edge of the workpiece rests upon a pin P¹⁰, for example, of the lower horizontal row of holes in the block, while another pin P¹¹ engages one of the other edge of the workpiece. It will be understood that there would ordinarily be a third pin (not shown), projecting from another hole in the block to engage the opposite edge (not shown) of the workpiece. The workpiece W is thus held rigidly in position and at the desired elevation and angle for operation by a tool (not shown). It will be evident that by the use of such a block as that herein disclosed, it is possible to arrange a workpiece at almost any desired angle merely by placing pins in selected holes and, in most instances, by the employment of the arcuate rows of holes, indexed to show definite angles, and especially by the employment of the pegs of FIG. 6a, to set up the workpiece for an almost unlimited number of predetermined angles without requiring the making of measurements or a cut-and-try method of ascertaining the proper set up of the pins.

While a desirable embodiment of the invention has herein been illustrated and described by way of example it is to be understood that the invention is broadly inclusive of any and all modifications falling within the scope of the appended claims.

I claim:
1. In combination with a machine tool comprising relatively movable jaws for holding a workpiece for machining, means for supporting a workpiece in a predetermined position between the jaws, said means comprising a unitary rigid block designed to be disposed between the jaws and having a plurality of holes formed therein, and, in combination therewith, pins to be inserted in selected holes of said block to support the workpiece in a predetermined angular position, the pins being of a length exceeding the thickness of the block but of a length less than the combined thickness of the block and workpiece thereby to avoid interference with the closing of the vise jaws; characterized in that each of two, respectively, of said holes is at the center of one of an arcuate row of holes, the holes in each respective arcuate row being equally spaced apart, each hole of a given row being indexed to indicate the number of degrees of arc between the center of the selected hole and a rectilinear reference line through the centers of curvature of the two rows, the holes of one row being indexed to indicate even numbered degrees and the holes of the other row being indexed to indicate odd number of degrees.

2. The combination according to claim 1, further characterized in that certain holes form a rectilinear row parallel to the longitudinal edge of the block, two spaced holes of said row defining the centers of curvature of the respective arcuate rows of holes, all of the holes in the block being of the same diameter and the holes in each arcuate row being spaced 10° apart.

3. The combination according to claim 1, further characterized in that certain of the holes form two parallel rectilinear rows of holes near the upper edge of the block, two spaced holes of the upper horizontal row being at the centers of curvature of the respective arcuate rows, the centers of the holes of each respective row defining an arc of 90° extent, the holes in each respective arcuate row being spaced 10° apart on center but with the uppermost or 0° hole in one row centered on the base or reference line, while the uppermost hole of the other row is spaced 5° down from the base line.

4. The combination according to claim 1, further characterized in having, in combination with the block, a series of special pins or pegs, each peg having an integral head of a diameter larger than that of the body of the pin, the heads of said special pins or pegs being of such a range of diameter that when one of said special pins or pegs is substituted for one of the normal pins in one of the holes of one of the arcuate rows, it thereby acts to position a workpiece at an angle which will differ from 1 to 4°, according to the peg selected, from that angle which would result from the employment of a normal pin in the same hole.

5. The combination according to claim 1, further characterized in that the block has two rectilinear, vertically spaced rows of pin-receiving holes near its upper edge, a similar row of pin-receiving holes near its lower edge, a vertical row of pin-receiving holes midway between the arcuate rows, a short rectilinear row of pin-receiving holes spaced above the aforesaid lower row of holes but below the lowest hole in the vertical row, the pins and the pin-receiving holes being machined to close tolerances for snug but removable fitting of the pins, all of the holes of the block being of the same diameter and all of the normal work-positioning pins being of a diameter of .125 inch, while the diameter of the heads of the several pegs vary progressively in diameter, commencing with 0.160 and increasing 0.264 inch—the heads of the several pegs being indexed according to their respective sizes.

6. The combination according to claim 1, further characterized in that the block is of hard steel; a length of approximately 6 inches and of a width of approximately 1.5 inches, and of a thickness of approximately 0.500 inch; and the radius of curvature of each arcuate row of holes is 1.00 inch, and the holes are of a diameter of 0.126 inch.

7. A device for supporting a workpiece while being machined and while gripped between the relatively movable jaws of a vise, said device comprising a solid unitary, substantially rectangular block of hardened steel having parallel, substantially flat upper and lower faces; parallel front and rear faces; and parallel end faces, the lower rear edge of the block being beveled, the block having parallel rows of uniformly spaced holes extending completely through it from its front to its rear face and which are designed for the reception of removable, work-supporting pegs or pins, there being at least two rows of holes near the upper face of the block and another row of holes near the lower face of the block, said rows extending substantially the full length of the block, the block being further characterized in having two arcuate rows of holes, the center of curvature of one of said arcuate rows being at the axis of one of the holes of the upper row, and the center of curvature of the other arcuate row being at the axis of another hole of the upper row, the holes in each arcuate row being equally spaced apart and the holes of one arcuate row being indexed to indicate even-number degrees and the holes of the other arcuate row being indexed to indicate odd-number degrees.

8. A device according to claim 7, further characterized in that the block also has a shorter horizontal row of holes, spaced above the lower row and symmetrically disposed with relation to the opposite ends of the block, and also a short vertical row of holes at the middle of the block.

9. A device according to claim 7, further characterized in having, in combination with the block, a series of normal pins of a length exceeding the thickness of the block but of a length less than the combined thickness of the block and any workpiece with which the device is to be used thereby to avoid interference with the closing of the vise jaws, said normal pins being cylindrical and of a diameter such as to provide strength sufficient to support a workpiece.

10. A device according to claim 9, further characterized in having, in combination with the block, a series of special pins or pegs, each having a cylindrical shank portion of a diameter like that of the normal pins and such as to have an easy sliding fit within any of the holes of the block but having a head of a larger diameter, the heads of the special pins or pegs being of such a range of diameter that when one of the special pins or pegs is substituted for one of the normal pins in one of the holes of one of the arcuate rows of holes it thereby acts to position a workpiece at an angle which will differ from 1° to 4°, according to the peg selected, from that angle which would result from the employment of the normal cylindrical pin in the same row.

11. A device according to claim 7, further characterized in that all of the pin-receiving holes are of a diameter of 0.126″ while the diameters of the pins are of 0.125″ and the diameters of the heads of the special pins or pegs vary progressively, commencing with 0.160″ and increasing to 0.264″.

References Cited

UNITED STATES PATENTS

| | | |
|---|---|---|
| 2,366,385 | 1/1945 | Comfort. |
| 2,369,425 | 2/1945 | Becker. |
| 2,508,837 | 5/1950 | Peffers. |

ROBERT C. RIORDON, Primary Examiner

D. R. MELTON, Assistant Examiner

U.S. Cl. X.R.

33—174; 269—9